3,180,746
PROTECTIVE COATING

Robert H. Patton, Baytown, James B. Cox, Pasadena, and Wesley K. Stich, Jr., Houston, Tex., assignors, by mesne assignments, to Esso Research and Engineering Company, Elizabeth, N.J., a corporation of Delaware
No Drawing. Filed Aug. 3, 1961, Ser. No. 128,963
28 Claims. (Cl. 106—74)

The present invention is directed to a single-application inorganic protective coating. More particularly, the invention is concerned with a liquid treating composition comprising a lithium-sodium silicate solution. In its more specific aspects, the invention is concerned with the application of this lithium-sodium silicate solution used alone or with specific additives to numerous material as a protective, insulating, bonding, etc., coating.

The present invention may be briefly described as a single-application liquid coating composition which comprises an aqueous solution of a mixture of lithium and sodium silicate, the lithium and sodium silicates being employed in amounts sufficient to provide a ratio of lithium oxide to sodium oxide to silicon dioxide, respectively, within the range from about 0.75 to about 1.00:about 0.05 to about 0.25:about 2.5 to about 5.0. In its more specific aspects, the invention is concerned with the addition of certain additives to the lithium-sodium silicate solution to provide specially adapted coating materials.

The lithium-sodium silicate solution of the present invention has been found to have numerous uses when used alone or when additives are combined with the lithium-sodium silicate solution for specific purposes. The solution of the present invention when used alone may be applied by brush, spray or dipping and renders flexible materials such as paper or fabric into a rigid form having moisture resistant and nonflammable properties. Materials which are rigid can be sealed against the passage of moisture and made fireproof by the solution of the present invention. Also, the solution of the present invention can be colored with stable dyes to impart desirable colors. When applied to either a flexible or rigid material, the solution of the present invention impregnates the material with a protective coating to a greater extent than known silicate solutions having comparable molar concentration because of the lower viscosity of the solution of the present invention. The protective coating is strong, moisture resistant, fire resistant, and has a low porosity. The protective nature of the coating has been found effective not only against water and fire, but provides protection from such things as abrasion, wear, weather, high temperatures, biological decomposition, etc. The solution when applied to a material dries rapidly and when dried, surprisingly results in an insoluble coating.

The solution of the present invention is also capable of lending strength to wood as well as protection against rot, fire, water absorption, and may also be effective against termites, wood borers and other destructive insects. Further, the solution of the present invention is capable of bonding, waterproofing and general strengthening of glass matting, asbestos, paper, cloth and similar materials. The solution may be sprayed, brushed, rolled or mopped on surfaces such as insulation, paper, cardboard, and similar materials, or generally a surface of such a nature which may be impregnated with the solution. Still further, the solution of the present invention has been found to be a new and useful surface bonding, adhesive and cementing agent.

The present invention is still further directed to a single-application coating material wherein the solution of the present invention is used as a liquid vehicle to which is mixed inert fillers such as asbestos, dye and/or colored pigments, and emulsified polymers such as vinyl acetate and butyl rubber. The coating of the present invention which incorporates the polymers and inert fillers and pigments is suitable for coating metal, concrete, brick, plaster, and similar materials. The resulting coating is inexpensive, nonflammable, odorless and easy to apply by brush, roller or spray. The resulting film imparts color, corrosion protection, and seals the surface against the passage of moisture. The alkaline nature of the concrete, plaster, etc., does not affect the coating's durability nor its ability to provide a water resistant protective coating. Thus, the protective coating of the present invention has application in coating concrete piping, coloring and sealing concrete blocks, plaster and bricks, marking highways, runways and parking areas, protection of metal surfaces, decorative coating for concrete floors, and general maintenance painting.

Surprisingly, it has been found that the incorporation of a dispersion of a metallic dust in the lithium-sodium silicate solution of the present invention, the lithium-sodium silicate solution being used as a liquid vehicle, with a small but effective amount of an alkaline metal dichromate provides a useful and important protective coating for metallic surfaces such as storage tanks for crude petroleum and fractions thereof such as gasoline, kerosene, gas oil, diesel oil, heating and lubricating oils, etc. The coating composition may also be employed to protect ships' bottoms and the interior of ships, tanks and the like, providing protection from corrosion without contamination of hydrocarbons, aqueous solutions, and the like contained in the tanks.

The present invention is also concerned with a method of preparing the lithium-sodium silicate solution in which lithium hydroxide which is preferably the monohydrate since it is easier to use and commercially available, sodium hydroxide and silica containing materials such as silicic acid and silica gel, are added to water while agitating same, following which the admixture is heated while continuing the agitation thereof to a temperature within the range from about 75° to about 150° C. for a sufficient length of time to form a mixture of lithium and sodium silicates. The sodium and lithium hydroxide and silica containing material are used in amounts sufficient to provide a ratio of lithium oxide to sodium oxide to silicon dioxide within the range from about 0.75 to about 1.00:about 0.05 to about 0.25:about 2.5 to about 5.0, respectively, following which the admixture is cooled to a temperature within the range from about 20° to about 30° C. at which temperature any solids go into solution and form an aqueous solution thereof.

The invention will be further illustrated by the following specific examples which are given by way of illustration and not as limitations on the scope of the invention.

One aspect of the present invention is the making and use of the lithium-sodium silicate solution without the addition of any additive materials. The composition in accordance with this aspect of the invention was made up in the following manner:

EXAMPLE 1

Water, silica gel, lithium hydroxide, and sodium hydroxide are charged into a stainless steel pressure vessel equipped with an agitator. During the initial mixing of these ingredients, evolution of heat raises the temperature of the contents to 50°–55° C. The reactor is then sealed and the temperature of the reactants, under continual agitation, is raised to 150° C. over a period of time, which may vary from thirty to ninety minutes. After the vessel reaches about 150° C. and about 70 pounds per square inch of pressure, the contents are slowly cooled at a rate of about 0.61° C. to about 1.83° C. per minute. This will result in a temperature drop from 150° C. to about 95° C. within about thirty to about ninety minutes. This completes the initial part of the reaction which forms the solid sodium lithium silicate.

The second part of the operation (below 95° C.) requires a longer period of time in order to effectively dissolve the solid silicate at lower temperatures. The reduction of the temperature of the reactor contents from 95° C. to 40° C. at a rate of about 0.37° C. to about 0.146° C. per minute should be accomplished within 150 minutes to 240 minutes. The last temperature drop from 40° C. to 25° C. may be conducted over a period of 60 to 120 minutes at a cooling rate of about 0.25° C. to about 0.125° C. per minute.

Depending upon the amount of water used, the solution may be used in different solids ratios, i.e., the total solids of the solution may vary from about 10% to 45% by weight.

EXAMPLE 2

A solution was prepared in a manner similarly as described in Example 1 except that it was made from the following ingredients:

| | Grams |
|---|---|
| Sodium hydroxide | 20 |
| Lithium hydroxide monohydrate | 62 |
| Silica gel | 300 |
| Water | 1146 |

This solution can be described as $(0.75\ Li_2O+0.25\ Na_2O):5\ SiO_2$ with a total solids content of about 25%. Cloth fabric and paper were saturated with this aqueous solution and allowed to air dry. After drying they were rigid, fireproof, and withstood 72 hours' exposure to 100% relative humidity at 40° C.

EXAMPLE 3

The identical solution described in Example 2 was used except Amacid Red Violet 2R Dye obtained from Koppers Chemical Company was added to impart color. The same excellent water resistance and fireproofing was achieved, and the material exhibited a pleasing reddish color.

EXAMPLE 4

A solution identical to Example 2 was used as an adhesive binder for asbestos. The resulting composition was moisture resistant and fireproof. The composition was heated under an open flame for 3 hours and then inserted directly into cold water without affecting the cohesion of the material.

EXAMPLE 5

A solution from Example 2 was used to seal preformed asbestos insulation against the passage of moisture. The solution was colored with a stable red dye in order to produce a colored seal coating. After 120 hours exposure to 100% relative humidity at 40° C., the solution exhibited excellent waterproofing properties.

From the foregoing examples it can be seen that the resulting lithium-sodium silicate composition of the present invention is moisture resistant and fireproof when applied by brush, spray or dipping to paper, fabric, cardboard, wallboard and similar materials. The solution of the present invention is prepared having a total solids content of between about 10% and about 35% by weight for the foregoing purposes.

The solution of the present invention may be used to protect wood when the total solids of the solution varies from about 10% to 35% by weight as shown by the following examples.

EXAMPLE 6

*Liquid compound and preparation*

| | Grams |
|---|---|
| Lithium hydroxide monohydrate | 62.0 |
| Sodium hydroxide | 20.0 |
| Silica gel | 270.0 |
| Water | 952.0 |

These chemicals were placed into a stainless steel pressure vessel under continual agitation. The temperature was raised to 150° C.; then the temperature was gradually reduced to 25° C. over an eight hour period in a manner similar to Example 1.

EXAMPLE 7

| | Grams |
|---|---|
| Compound (of Example 6) | 500.0 |
| Water | 100.0 |

This mixture was placed into a container and three types of wood (pine, oak, fir) were immersed for 30 minutes under a constant pressure of 25 mm./Hg. The wooden panels were removed and dried thoroughly, then subjected to an open flame. The wood was charred but at no time did it burn. A microscopic examination revealed that approximately 60% of the voids in the wood were occupied by silica.

From the foregoing example it can be seen that the solution of the present invention is capable of lending strength to wood as well as protection against rot, fire, and water absorption, etc.

The solution of the present invention rather than being applied as a film may be applied by mixing the lithium-sodium silicate solution in a matrix such as glass fibers, asbestos, paper fibers, saw dust, and similar materials, and applied to a material as a protective coating directly by trowel. When mixed in a matrix of material the solution of the present invention has a solids content of about 10% to 35% by weight. It has been found that the solution of the present invention whether applied as a film or mixed in a matrix is completely water insoluble when cured and is unaffected by most chemicals with the exception of hydrogen fluoride and strong concentrated alkalies. The effectiveness of the nonflammable, odorless, nontoxic solution is shown by the following examples.

EXAMPLE 8

| | Grams |
|---|---|
| Lithium hydroxide monohydrate | 62.0 |
| Sodium hydroxide | 20.0 |
| Silica gel | 270.0 |
| Water | 952.0 |

These chemicals were placed into a stainless steel pressure vessel under continual agitation. The temperature was raised to 150° C.; then the temperature was gradually reduced to 25° C. over an 8 hour period in a manner similar to Example 1.

EXAMPLE 9

(1) Solution of Example 8—25% solids
(2) 30 oz. glass matting

The glass matting was dipped in the solution and allowed to air dry at 25° C. for 2 hours. The matting was then subjected to elevated temperatures and exhibited rigidity and superior binding qualities at temperatures nearing the melting point of glass.

EXAMPLE 10

(1) Solution of Example 8—25% solids
(2) 24 oz. woven raving

The solution was applied to the roving with a brush and allowed to air dry for 2 hours at 25° C. The roving exhibited rigidity and was unaffected by an open flame and water.

EXAMPLE 11

(1) Solution of Example 8—25% solids
(2) Asbestos

The solution was mixed with asbestos fibers and applied by brush to a sandblasted furnace stack at approximately 90° C. The asbestos and lithium-sodium silicate solution exhibited excellent adhesion and good insulative qualities.

EXAMPLE 12

(1) Solution of Example 8—25% solids
(2) Paper fibers

The paper fibers were dispersed in the solution and applied by hand to a steam line exposed to the weather. After 60 days' exposure there was no visible deterioration and excellent adhesion as well as insulative qualities were observed.

EXAMPLE 13

(1) Solution of Example 8—25% solids
(2) Preformed pipe insulation

The solution was sprayed onto new preformed pipe covering exposed to natural weathering and tested for 60 days; no visible deterioration was evident and the insulation appeared to be water insensitive.

EXAMPLE 14

(1) Solution of Example 8—25% solids
(2) Cardboard

The cardboard was dipped in the solution and allowed to air dry at 25° C. for 4 hours. The cardboard exhibited excellent water insensitivity and rigidity.

Another unique feature of the present invention is that the lithium-sodium silicate solution may be used as a surface bonding, adhesive, and cementing agent. The surface bonding agent of the present invention is useful in the bonding of two or more surfaces to produce a strong, water resistant bond. In particular, the bonding agent of the present invention can be used for a large variety of surfaces such as: wood, paper, cardboard, cloth, plastics, glass, metal, concrete, brick, etc. As a new and useful surface bonding, adhesive, and cementing agent, the lithium-sodium silicate solution of the present invention can be used by itself or in admixture with various additives. Two classes of additives have been found to be the most effective. Materials such as casein, clay, sugars, aluminates, asbestos, and organic materials act as fillers whereas materials such as borax, potassium chloride, and potassium bromide act as curing agents to enhance the rate of polymerization of the silicate solution during air drying. The additives are mixed with the solution of the present invention in amounts such that the total additives make up between about 0.0% and 85% by weight of the mixed solution. However, of the additives the filler material is used in the range of about 0.0% to about 80% by weight of the mixed solution and preferably between about 5% and about 80% by weight, whereas the curing agents are used in amounts within the range of about 0.01% to about 5.0% by weight, preferably 0.01% to 3.0% by weight of the mixed solution. The addition of the additives to the solution improves the quality of bonding obtained in a specific application. A preferred adhesive composition comprises adding to the lithium-sodium silicate solution of the present invention clay as a filler material in an amount of about 5% to about 20% by weight of the composition and borax as a curing agent in an amount of about 0.2% by weight of the composition.

It has been found that the mixed lithium-sodium silicate solution of the present invention, when applied to a surface and allowed to dry, has a much smaller porosity than other silicate solutions, and hence, the bonding, adhesive, and cementing characteristics of the present invention are greater than other known silicates.

The following examples are given as illustrations of the bonding, adhesive and cementing characteristics of the present invention:

EXAMPLE 15

The lithium-sodium silicate solution, identical in composition to that described in Example 2, was applied to the surface of two pieces of ordinary, brown cardboard. The two pieces of cardboard were then pressed together and held under pressure in a vise and allowed to dry for 24 hours. The resulting bonding was excellent as evidenced by the fact that upon pulling the two pieces apart, the paper fibers were pulled apart rather than a separation occurring at the original interface.

EXAMPLE 16

In another experiment, an adhesive mixture was prepared by thoroughly mixing 80 parts of the lithium-sodium silicate solution of Example 2 with 20 parts of dry powdered clay. A small double layer piece of cheese cloth was dipped into this mixture and placed between two pieces of brown paper and pressed together in a vise for a period of two hours. The sample was then removed and allowed to dry for an additional hour. The resulting bonding was stronger than the paper itself.

Another aspect of the present invention is a water soluble coating which will dry by water evaporation into a water and hydrocarbon resistant film composition for metal, concrete, brick, plaster and similar materials which are of such a nature as to be impregnated with the soluble coating. The soluble coating is obtained by using the lithium-sodium silicate solution of the present invention as a liquid vehicle and adding thereto a mixture of inert fillers such as asbestos, dye and/or colored pigments and emulsified polymers such as vinyl acetate and butyl rubber. The addition of the dye or colored pigments is an optional feature; however, the addition of color to the coating enhances the appearance of the coating composition and therefore finds utility in many more instances. The best general coating composition illustrating this aspect of the invention can be described by the general formula A (polymer)+B [(C $Li_2O$+D $Na_2O$):E $SiO_2$] wherein the coefficients A, B, C, D and E have the following numerical values:

A=50 to 100 parts by weight
B=5 to 50 parts by weight
C=0.75 to 1.0 mole
D=0.05 to 0.25 mole
E=2.5 to 5.5 moles Further, the concentration of the coating composition should be such that the total solids of the composition should be about 30%–40% by weight. The advantages of water soluble coating having the polymers incorporated therein are shown by the following specific examples which are given by way of illustration and not as limitations on the scope of the present invention:

EXAMPLE 17

*Lithium-sodium silicate vehicle*

|  | Grams |
|---|---|
| Lithium hydroxide monohydrate | 62.0 |
| Sodium hydroxide | 20.0 |
| Silica gel | 270.0 |
| Water | 952.0 |

These ingredients were placed into a stainless steel pressure vessel under continual agitation. The temperature was raised to 150° C.; then the temperature was gradually reduced to 25° C. over a period of 8 hours in a manner similar to Example 1.

*Polyvinyl acetate component*

|  | Grams |
|---|---|
| Vinyl acetate | 43.75 |
| 2-ethylhexyl acrylate | 6.25 |
| Water | 78.00 |
| "Tergitol" NPX | 0.75 |
| "Cellosize" WP–09 | 1.00 |
| Potassium persulfate | 0.18 |

The "Cellosize," a hydroxyethyl cellulose protective colloid; "Tergitol," an alkyl phenyl ether of polyethylene glycol which acts as a surface active agent emulsifier; and potassium persulfate, used as a catalyst, are blended into the water in a polymerization reactor equipped with an agitator and a condenser. The vinyl acetate and 2-ethylhexyl acrylate are combined and 10% by weight is added to the aqueous system. The aqueous system is warmed to 70° C. with agitation. The remaining vinyl acetate and 2-ethylhexyl acrylate mixture is added with stirring over a three-hour period maintaining the temperature of the reaction at 70–80° C. After the addition is complete, agitation is continued for one-half hour. The contents are then cooled to room temperature.

*Coating composition*

| | Grams |
|---|---|
| Lithium-sodium silicate vehicle | 500 |
| Polyvinyl acetate emulsion | 500 |
| Iron oxide | 50 |
| Inert talc filler | 200 |

The iron oxide and talc are dispersed in the vinyl acetate emulsion and the silicate solution is then added. The coating mixture was applied over ferrous metal surfaces which had been wire brushed. Upon drying by water evaporation, the coating exhibited excellent adhesion, hardness and moisture resistance. It had an initial gloss of 30 as determined by a 60° gloss meter, withstood a ⅛ inch mandrel bend for flexibility and 8000 scrub cycles in a 5% soap solution (ASTM D–16). The coating was not affected after 96 hours' exposure to 100% relative humidity at 40° C.

EXAMPLE 18

Another coating composition was prepared in the same manner as described in Example 17 but having the following composition:

A (emulsified polyvinyl acetate)
$+B [(C Li_2O+D Na_2O):E Si_2O]$

A=75 parts by weight
B=25 parts by weight
C=0.75 mole
D=0.25 mole
E=4.5 moles

*Coating composition*

| | Grams |
|---|---|
| Polyvinyl acetate emulsion | 750 |
| Lithium-sodium silicate vehicle | 250 |
| Iron oxide | 50 |
| Inert talc filler | 200 |

This coating upon drying by water evaporation exhibited the same superior adhesion and hardness properties as Example 17. It withstood an ⅛ inch bend for flexibility and 6000 scrub cycles (ASTM D–16).

EXAMPLE 19

A coating composition was prepared in the same manner as described in Example 17 except it had the following composition:

A (polyvinyl acetate emulsion)
$+B [(C Li_2O+D Na_2O):E Si_2O]$

A=100 parts
B=0 part
C=0 part
D=0 part
E=0 part

*Coating composition*

| | Grams |
|---|---|
| Polyvinyl acetate | 1000 |
| Iron oxide | 50 |
| Inert talc filler | 200 |

This coating had poor adhesion and hardness. It exhibited blistering after 96 hours' exposure to 100% relative humidity at 40° C. It withstood only 350 scrub cycles (ASTM D–16).

EXAMPLE 20

Another coating composition was prepared in the same manner as described in Example 17 except it had the following composition:

A (polyvinyl acetate emulsion)
$+B [(C Li_2O+D Na_2O):E Si_2O]$

A=0 part
B=100 parts
C=0.75 mol
D=0.25 mol
E=4.5 moles

*Coating composition*

| | Grams |
|---|---|
| Lithium-sodium silicate vehicle | 1000 |
| Iron oxide | 50 |
| Inert talc filler | 200 |

This coating was not completely satisfactory in that it became very brittle and flaked from the surface. Further, it failed to produce a continuous film. Although brittle, it exhibited excellent water insoluble properties.

EXAMPLE 21

Butyl rubber latex was pigmented and applied to a steel panel where it air dried with some corrosion of the steel. It had very poor adhesion and hardness. However, the addition of the lithium-sodium silicate as shown in the immediately following table resulted in a film that was superior in adhesion, hardness and flexibility.

*Coating composition*

| | Grams |
|---|---|
| Lithium-sodium silicate vehicle | 250 |
| Butyl rubber latex, 54% solids | 1000 |
| Water | 100 |
| Talc-inert filler | 200 |
| Iron oxide | 50 |

From the foregoing examples, it can be seen that when the solution of the present invention is to be used on materials having a smooth, hard and non-porous surface, it finds its most effective utility as a liquid vehicle for specific additives which improve the adhesive and finishing qualities of the protective coating. Thus according to one aspect of the present invention, as illustrated heretofore, emulsified polymers such as polyvinyl acetate, butyl rubber, and polyvinyl chloride may be mixed with the liquid vehicle of the present invention.

Another important aspect of the present invention is to form a dispersion of metallic dust in the aqueous lithium-sodium silicate solution of the present invention. It has been found that the dispersion of a metallic dust, such as zinc, in the aqueous solution of the present invention, used as a liquid vehicle, and a small but effective amount of an alkali metal dichromate provides a useful coating for protecting metallic surfaces. Surprisingly, the coating provides protection from corrosion without contamination of hydrocarbons, aqueous solutions, and the like, which may be in contact with the coated surfaces. A composition representing this aspect of the present invention is made in the same manner as fully described in Example 1 except that after the solution has cooled, a small but effective amount of an alkali metal dichromate, such as sodium or potassium dichromate, may be added. A finely divided metal, such as zinc dust, is then added to the cooled solution in sufficient amounts to provide a protective surface when the composition is to be applied to exposed surfaces. Optionally, there may be added to the cooled solution prior to, or simultaneously with the zinc dust an alkaline borate, iron oxide, sodium bicarbonate, and other metals and compounds, if desired, which improve the characteristics of the protective metal coating when the solution is applied to an exposed surface.

The finely divided metal is preferably zinc dust having a particle size within the range from about 3 to about 25 microns; however, a preferred particle size is within the range from about 6 to about 10 microns. With the zinc dust may be used other metallic dusts, such as aluminum dust, magnesium dust, and selected metal oxide dust such as manganese dioxide, titanium dioxide, iron oxide and the like. It is preferred, however, that when other metallic ingredients are employed that the zinc dust be used in a major amount. Other materials such as sand and silica gel may be employed, but it is to be emphasized that zinc dust is preferred, especially in protecting metallic surfaces. It has been found that when a small but effective amount of the metal oxides is used that this improves abrasion resistance, resistance to boiling water and hot salt water spray and also improves the over-all general appearance of the metallic coating when applied to exposed surfaces.

It is emphasized that, in the practice of the present invention, the lithium and sodium silicates be employed in amounts sufficient to provide a molar ratio of lithium oxide to sodium oxide to silicon dioxide within the range from about 0.75 to about 1.00:about 0.05 to about 0.25:about 2.5 to about 5.0, respectively. A preferred ratio when a metallic dust is added is 0.8 of lithium oxide:0.2 of sodium oxide:4.5 of silicon dioxide. The total weight percent of the lithium hydroxide and sodium hydroxide in the solution having a metallic dust may range from about 5.0 to about 15.0 percent. The amount of silica gel or silicic acid may range from about 8 to about 25 percent by weight.

It is desirable in the practice of this aspect of the present invention to employ an alkaline borate in the composition inasmuch as the presence of an alkaline borate, such as sodium borate, potassium borate, or ammonium borate, greatly reduces or eliminates the friability of the final coating and allows the provision of a thicker coat than otherwise might be obtained. An amount of the alkaline borate in the range from 0.01 to about 0.20 percent by weight may be used. Thus, single-application compositions wherein the borate is not present and used to provide coatings having a thickness not greater than from about 3 mils to about 6 mils, may have surface cracks rendering the coatings unsuitable. Where an alkaline borate is present in the amount above stated, however, a coating of at least 18 mils thickness may be obtained with no signs of surface cracking.

Also, when using metallic dust in the solution of the present invention, it is desirable to employ an alkaline bicarbonate, such as sodium or ammonium bicarbonate. The presence of this material improves the water insolubility and accelerates the "self-curing" or "air-curing" characteristics of the coating. Where an alkaline bicarbonate is employed, it may be present in an amount in the range from about 0.01 to about 0.20 percent by weight.

An important feature of the present invention when preparing a coating for a metallic surface is the presence of an oxidizing agent, such as an alkaline dichromate as exemplified by potassium dichromate or sodium dichromate. The presence of the oxidizing agent increases the useable or pot life of the coating material after metal dust and the liquid vehicle have been admixed. For example, by dissolving 0.05 to 0.10 percent by weight of potassium dichromate in the liquid vehicle, the useful life of the coating mixture is substantially lengthened.

The composition of this aspect of the present invention may be made up as follows:

EXAMPLE 22

A stainless steel autoclave suitably equipped with a stirring device and capable of withstanding an internal autogenous pressure of at least 600 p.s.i., and equipped with a heating device such that the contents may be heated to about 150° C. is provided. The autoclave is charged with 400 parts by weight of water and the stirring device is placed in operation. About 34 parts of lithium hydroxide containing 1 molecule of water and 8 parts of sodium hydroxide are added to the water in the autoclave and stirred from about 5 to about 10 minutes. Thereafter, about 126 parts of silica gel are added. Silicic acid may be substituted for the silica gel, but it will be necessary to adjust the amount thereof because of the presence of the water of hydration. The autoclave is then closed and stirring is continued and it is then heated to a temperature within the range indicated, preferably about 140° to about 150° C. The temperature of the contents of the autoclave is brought up to the maximum temperature over a period of about 30 minutes, and thereafter the temperature is slowly reduced to a temperature of about 20° to about 30° C., preferably about 25° C., over a period up to about 6 hours. Stirring may then be continued for an additional period of time up to about 14 hours, at which time there is added to the contents of the autoclave about 0.05 percent by weight of an alkaline dichromate, such as potassium dichromate. An alkaline borate, such as sodium borate, in an amount of about 0.02 percent by weight and an alkaline bicarbonate, such as sodium bicarbonate in an amount of about 0.15 percent by weight may also be added. Stirring is continued until a complete solution is effected, which may be for about 10 minutes. This provides a single-application coating composition, and the composition is suitable for immediate use. To the liquid composition is then added about 300 parts of zinc dust for every 100 parts of the composition as described above. This composition may then be applied to a freshly sandblasted surface, such as a metallic surface as exemplified by steel, and allowed to dry by exposure to the atmosphere for about one hour.

At this point, it should be emphasized that compositions made up simply by mixing the several ingredients at ambient temperatures with stirring do not produce satisfactory coating compositions. For example, a coating inferior in quality to that produced in accordance with the present invention is produced when the ingredients are simply mixed together.

In order to illustrate that lithium and sodium silicates must be present in this aspect of the present invention, the following compositions are made up:

EXAMPLE 23

Sodium silicate is employed in this composition in a molar ratio of 3.22 of silicon dioxide to sodium oxide at 30 percent solids by weight employing 0.05 percent potassium dichromate. This aqueous solution is mixed at a 3:1 weight ratio using zinc dust having a particle size of 10 to 12 microns. When this composition is applied to a sandblasted steel panel and allowed to air dry one hour and then exposed to boiling water for 5 minutes, the coating is completely destroyed.

EXAMPLE 24

In another composition, a molar ratio of 4.5:1 of silicon dioxide to lithium oxide is employed at 26–27 percent solids by weight and the aqueous solution mixed at a 3:1 weight ratio using zinc dust having a particle size of 10 to 12 microns. Application of this composition to a sandblasted steel panel indicates unsatisfactory results when allowed to dry in air one hour and then exposed to boiling water for one hour. Thus, the coating is insoluble but exhibits excessive friability. The initial hardness of the coating is inadequate.

EXAMPLE 25

A similar composition is also made, except that zinc dust having a particle size of 3 to 5 microns is employed. On application of the resulting mixture to a sandblasted steel panel and drying for one hour, then exposing to boiling water for one hour, the coating is found insoluble, but exhibits friability. The initial hardness of the coating is adequate, but the film thickness is insufficient in that surface or mud cracking is observed.

EXAMPLE 26

Thereafter, a composition in accordance with the present invention was made wherein silicon dioxide to total lithium and sodium oxides in a molar ratio of 4.5:1.0 was prepared. In this instance, the ratio of lithium oxide to sodium oxide was 3:1. Potassium dichromate in an amount of 0.05 percent by weight was mixed with zinc dust, the zinc being employed in a ratio of 3 parts zinc to 1 part of solution. The resulting composition was applied to a sandblasted steel panel and allowed to dry in air for one hour and then exposed to boiling water for one hour. This composition exhibited unusual water insolubility and no friability was observed. Moreover, the initial hardness of the coating was greater than the corresponding lithium silicate composition.

EXAMPLE 27

The same composition was again prepared as in Example 26 except that zinc dust having a particle size of 3 to 5 microns was employed. When dried in air for one hour and exposed to boiling water for one hour, the composition again displayed unusual water insolubility, no friability and had extreme initial hardness.

EXAMPLE 28

Another composition wherein silicon dioxide to total lithium and sodium oxides in a molar ratio of 4.5 to 1.0 was prepared. In this instance, the ratio of lithium oxide to sodium oxide was 4:1. Potassium dichromate in an amount of 0.05 percent by weight was mixed with the alkali silicate solution. The zinc dust, having an average particle size of 7 to 9 microns, was employed in a ratio of 3 parts of zinc to 1 part of solution. The resulting composition was applied to a sandblasted steel surface and allowed to air dry for one hour, then exposed to boiling water for one hour. The composition exhibited unusual water insolubility and no friability was observed. The initial hardness of the coating was 8H as determined by standard pencils and it withstood 5 to 6 percent elongation upon being impacted with 13.4 foot pounds of force. Also, the resulting coating withstood one thousand hours exposure to 5% warm salt spray and one thousand hours exposure to 100 percent relative humidity at 40° C. without failure. The abrasion resistance of the coating, as determined by a Taber abraser, was outstanding and required 10,000 cycles to destroy 1 mil thickness of the coating. Adequate film thickness of 12–14 mils could be applied without surface cracking.

EXAMPLE 29

The same composition was again prepared as in Example 28 except that zinc dust having a particle size of 10–12 microns was employed. The resulting coating after air drying one hour exhibited the same unusual water insolubility, but had a soft, less abrasive resistant film. Only 6000 cycles on the Taber abraser was required to destroy one mil thickness of the film and the pencil hardness was 6H+. However, 15 to 20 mil film thicknesses could be applied without surface cracking and flaking of the coating.

EXAMPLE 30

Another composition wherein silicon dioxide to total lithium and sodium oxides in a molar ratio of 4.5:1.0, was prepared. In this instance, the ratio of lithium oxide to sodium oxide was 1:1. Potassium dichromate in an amount of 0.05 percent by weight was mixed with the alkali silicate solution. The zinc dust having an average particle size of 7 to 9 microns was employed in a ratio of 3 parts of zinc to 1 part of solution. The resulting composition was applied to a sandblasted steel surface and allowed to air dry for one hour, then exposed to boiling water for 30 minutes at which time, the coating was destroyed. The initial hardness of the coating was 8H+ as determined by standard pencils and withstood 5 to 6 percent elongation upon being impacted with 13.4 foot pounds of force. Also, the resulting coating exhibited 80 percent failure after being exposed for only one hundred and fifty hours in 5% warm salt spray and 80% failure after exposure of three hundred hours to 100% relative humidity at 40° C. However, thick films of 20 mils could be applied without surface cracking.

EXAMPLE 31

Another composition wherein silicon dioxide to total lithium and sodium oxides in a molar ratio of 4.5 to 1.0, was prepared. In this composition, the ratio of lithium oxide to sodium oxide was 9:1. Potassium dichromate in an amount of 0.05 percent by weight was mixed with the alkali silicate solution. The zinc dust having an average particle size of 10 to 12 microns was employed in a ratio of 3 parts of zinc to 1 part solution. The resulting composition was aplied to a sandblasted steel surface and allowed to air dry for one hour, then exposed to boiling water for one hour. The composition exhibited good water insolubility and very slight friability. The initial hardness of the coating was 6H as determined by standard pencils, and it withstood 5 to 6 percent elongation upon being impacted with 13.4 foot pounds of force. It passed a one-half inch mandrel bend for flexibility, but required only 6000 cycles on the Taber abraser to destroy one mil of coating thickness. Films of 15 to 16 mils could be applied without surface cracking or flaking of the coating.

EXAMPLE 32

The same composition was again prepared as in Example 31 except that zinc dust having a particle size of 7 to 9 microns was employed. The resulting coating after air drying one hour exhibited unusual water insolubility and excellent initial hardness of 6H+. Eight thousand cycles on the Taber abraser was required to destroy one mil of coating film, and it withstood 5 to 6 percent elongation upon being impacted with 13.4 foot pounds of force. Adequate film thickness of 10 to 12 mils can be applied without surface cracking and flaking.

In the foregoing compositions, reference is had to solids content. In the practice of the present invention, the total solids contained in the liquid composition should be in the range of about 24 to about 31 percent by weight as determined by heating a weighed quantity of the liquid composition at 110° C. for two hours and then weighing to determine the percent of solids.

The liquid composition in accordance with the present invention which is exclusive of the metallic dust and other additives was made up indicative of a commercial scale to consist essentially of the following.

| Components: | Pounds |
| --- | --- |
| Sodium hydroxide | 3.75 |
| Lithium hydroxide monohydrate | 11.75 |
| Silica gel | 50.50 |
| Water | 178.00 |
| Potassium dichromate | 0.122 |
| | 244.122 |

The several components, excepting the potassium dichromate, were charged, in the order shown, into a stainless steel pressure vessel equipped with an agitator. The mixture increased in temperature from 25° C. to 50° C. by evolution of exothermic heat. The vessel was then sealed and the temperature and pressure of the contents under continual agitation were raised to 150° C. and 60 pounds per square inch within 30 minutes. When the temperature reached 150° C., the contents of the vessel were slowly cooled at an average rate of 0.34° C. per minute which resulted in a temperature drop from 150° C. to 25° C. in 360 minutes. The pressure vessel was then opened and the potassium dichromate was added to the solution under vigorous agitation. When all of the chromate was completely dissolved, the finished lithium-sodium silicate was withdrawn from the vessel.

In employing the present invention, a useful protective coating mixture is provided by mixing a finely divided metal, such as a mixture of zinc or aluminum dust, with alkaline dichromate and optional ingredients with a liquid composition containing lithium and sodium silicates in a weight ratio of about 2:1 to about 4:1 of a metallic dust to liquid vehicle. The coating mixture is applied to a freshly sandblasted metal surface, such as steel or other metals, by spray, brush, roller or dipping and allowed to dry in the air. The resulting coating is abrasive resistant, withstands the action of boiling water for eight hours, withstands hot salt water spray for several weeks, and provides a superior coating composition. In testing the steel panels, the coating was sprayed on a freshly sandblasted piece of ⅛-inch thick steel plate four inches wide and four inches long. The test panels on which the coating was sprayed were air dried at about 25° C. for one hour and then subjected to physical testing, such as immersion in boiling water, exposure to a 5 percent heated salt-water spray for periods up to one thousand hours, exposure to 100 percent relative humidity at a temperature of 38° to 40° C. for a period of one thousand hours and exposure to hot liquid hydrocarbons. The hardness of the coating was determined by the use of standard pencils of various hardness ratings. Abrasion resistance was also employed as an indication of the hardness of the coating as determined by the Taber abraser with a CS–17 abrading wheel and 1000 gram load. Flexibility was determined by a 90° bend of a test panel on which the coating was applied and by impact of a coated panel with 13.4 foot pounds force.

The nature and objects of the present invention having been completely described and illustrated and the best mode thereof set forth, what we wish to claim as new and useful and secure by Letters Patent is:

1. A method for preparing a mixed lithium-sodium silicate solution comprising admixing lithium hydroxide, sodium hydroxide, a silica-containing material selected from the group consisting of silica gel and silicic acid, and water, while agitating same; heating said admixture while continuing the agitation thereof to a temperature within the range from about 75° to about 150° C. for a sufficient length of time to form an admixture of lithium and sodium silicates; said lithium and sodium hydroxides and silica-containing material being employed in amounts sufficient to provide a ratio of lithium oxide to sodium oxide to silicon dioxide within the range from about 0.75 to about 1.00 $Li_2O$:about 0.05 to about 0.25 $Na_2O$:about 2.5 to about 5.0 $SiO_2$, and a total solids from about 10 percent to about 45 percent by weight; and cooling said admixture to a temperature within the range from about 20° to about 30° C. to form an aqueous solution thereof.

2. A composition of matter comprising an aqueous solution of a mixture of lithium silicate and sodium silicate made by the method of claim 1 wherein said lithium and sodium hydroxides and silica-containing material are employed in amounts to produce a total solids of 24 percent to 31 percent by weight.

3. Glass matting impregnated with an aqueous solution of a mixture of lithium silicate and sodium silicate, said lithium silicate and said sodium silicate being employed in amounts sufficient to provide a molar ratio of lithium oxide to silicon dioxide within the range from about 0.75 to about 1.00 $Li_2O$:about 0.05 to about 0.25 $Na_2O$:about 2.5 to about 5.0 $SiO_2$ and a total solids of 24 percent to 31 percent by weight.

4. Woven roving impregnated with an aqueous solution of a mixture of lithium silicate and sodium silicate, said lithium silicate and said sodium silicate being employed in amounts sufficient to provide a molar ratio of lithium oxide to sodium oxide to silicon dioxide within the range from about 0.75 to about 1.00 $Li_2O$:about 0.05 to about 0.25 $Na_2O$:2.5 to about 5.0 $SiO_2$ and a total solids of 24 percent to 31 percent by weight.

5. Insulation material impregnated with an aqueous solution of a mixture of lithium silicate and sodium silicate, said lithium silicate and said sodium silicate being employed in amounts sufficient to provide a molar ratio of lithium oxide to sodium oxide to silicon dioxide within the range from about 0.75 to about 1.00 $Li_2O$:about 0.05 to about 0.25 $Na_2O$:about 2.5 to about 5.0 $SiO_2$ and a total solids of 24 percent to 31 percent by weight.

6. Paper fibers impregnated with an aqueous solution of a mixture of lithium silicate and sodium silicate, said lithium silicate and said sodium silicate being employed in amounts sufficient to provide a molar ratio of lithium oxide to sodium oxide to silicon dioxide within the range from about 0.75 to about 1.00 $Li_2O$:about 0.05 to about 0.25 $Na_2O$:about 2.5 to about 5.0 $SiO_2$ and a total solids of 24 percent to 31 percent by weight.

7. Wood impregnated with an aqueous solution of a mixture of lithium silicate and sodium silicate, said lithium and said sodium silicate being employed in amounts sufficient to provide a molar ratio of lithium oxide to sodium oxide to silicon dioxide within the range from about 0.75 to about 1.00 $Li_2O$:about 0.05 to about 0.25 $Na_2O$:about 2.5 to about 5.0 $SiO_2$ and a total solids of 24 percent to 31 percent by weight.

8. An adhesive composition comprising an aqueous solution of a mixture of lithium silicate and sodium silicate, said lithium silicate and said sodium silicate being employed in amounts sufficient to provide a molar ratio of lithium oxide to sodium oxide to silicon dioxide in the range from about 0.75 to about 1.00 $Li_2O$:about 0.05 to about 0.25 $Na_2O$:about 2.5 to about 5.0 $SiO_2$ and a total solids of 24 percent to 31 percent by weight; a filler material selected from the group consisting of casein, clay, sugar, aluminate, and asbestos present in an amount between 5 percent and 80 percent by weight; and a curing agent selected from the group consisting of borax, potassium chloride, and potassium bromide, present in an amount between 0.01 percent and 3.0 percent by weight.

9. A composition of claim 8 wherein the filler is clay and the curing agent is borax.

10. A composition of claim 8 wherein the filler is clay and makes up about 5% to about 20% by weight of said composition and the curing agent is borax and makes up about 0.2% by weight of said composition.

11. A water-soluble coating composition comprising an aqueous solution of a mixture of lithium silicate and sodium silicate, said lithium silicate and sodium silicate being employed in amounts sufficient to provide a molar ratio of lithium oxide to sodium oxide to silicon dioxide within the range from about 0.75 to about 1.00 $Li_2O$: about 0.05 to about 0.25 $Na_2O$:about 2.5 to about 5.0 $SiO_2$ and a total solids from about 10 percent to about 45 percent by weight; and emulsified polymer selected from the class consisting of polyvinyl acetate, polyvinylchloride, and butyl rubber; said solution of lithium silicate and sodium silicate being in the range of about 5 to 50 parts by weight, and the emulsified polymer being in the range of about 50 to 100 parts by weight.

12. A water soluble coating composition according to claim 11 wherein the emulsified polymer is polyvinyl acetate.

13. A water-soluble coating composition comprising a lithium-sodium silicate vehicle consisting of a mixture of lithium silicate and sodium silicate, said lithium and sodium silicate being employed in amounts sufficient to provide a molar ratio of lithium oxide to sodium oxide to silicon dioxide within the range from about 0.75 to about 1.00 $Li_2O$:about 0.05 to about 0.25 $Na_2O$:about 2.5 to about 5.0 $SiO_2$ and a total solids from about 10 percent to about 45 percent by weight, said vehicle being present in an amount between 50 to 100 parts by weight; a polyvinyl acetate emulsion present in an amount between 5 to 50 parts by weight; iron oxide present in about 5 parts by weight and inert talc filler present in about 20 parts by weight.

14. A water-soluble coating composition according to claim 13 wherein said lithium silicate and sodium silicate are employed in amounts sufficient to provide a molar ratio of about 0.75 $Li_2O$:about 0.25 $Na_2O$:about 4.5 $SiO_2$ and a total solids of 24 percent to 31 percent by weight.

15. A single-application coating composition comprising lithium silicate and sodium silicate, said lithium silicate and said sodium silicate being employed in amounts sufficient to provide molar ratio of lithium oxide to sodium oxide to silicon dioxide within the range from about 0.75 to about 1.00 $Li_2O$:about 0.05 to about 0.25 $Na_2O$:about 2.5 to about 5.0 $SiO_2$ and a total solids of 24 percent to 31 percent by weight, and an alkali metal dichromate in an amount from about 0.05 to about 0.10 percent by weight.

16. A single-application liquid coating composition comprising a dispersion of zinc dust in an amount sufficient to provide a protective coating on metallic surfaces protected by zinc in an aqueous solution of a mixture of lithium silicate and sodium silicate, said lithium silicate and said sodium silicate being employed in amounts sufficent to provide a molar ratio of lithium oxide to sodium oxide to silicon dioxide within the range from about 0.75 to about 1.00 $Li_2O$:about 0.20 to about 0.25 $Na_2O$:about 4.5 $SiO_2$ and a total solids of 24 percent to 31 percent by weight and an alkali metal dichromate in an amount from about 0.05 to about 0.10 percent by weight.

17. A composition in accordance with claim 16 in which the zinc dust has a particle size within the range of about 3 to 25 microns.

18. A composition in accordance with claim 16 in which the particle size of said zinc dust is within the range from about 6 to about 10 microns.

19. A method for preparing a liquid vehicle for a single-application coating composition which comprises admixing lithium hydroxide, sodium hydroxide, and a silica-containing material selected from the group consisting of silica gel and silicic acid, and water while agitating same; heating said admixture while continuing the agitation thereof to a temperature within the range from about 75° to about 150° C. for a sufficient length of time to form an admixture of lithium and sodium silicates; said lithium and sodium hydroxides and silica-containing material being employed in amounts sufficient to provide a ratio of lithium oxide to sodium oxide to silicon dioxide within the range from about 0.75 to about 1.00 $Li_2O$:about 0.05 to about 0.25 $Na_2O$:about 2.5 to about 5.0 $SiO_2$ and a total solids from about 10 percent to about 45 percent by weight; cooling said admixture to a temperature within a range from about 20° to about 30° C. to form an aqueous solution thereof; and then adding to said cool solution an amount from 0.05 to 0.10 percent weight of an alkali metal dichromate.

20. A method for preparing a liquid vehicle for a single-application coating composition which comprises admixing lithium hydroxide, sodium hydroxide, a silica-containing material selected from the group consisting of silica gel and silicic acid and water, while agitating same; heating said admixture while continuing the agitation thereof to a temperature within the range from about 75° to about 150° C. for a sufficient length of time to form an admixture of lithium and sodium silicates; said sodium and lithium hydroxides and silica-containing material being employed in amounts sufficient to provide a ratio of lithium oxide to sodium oxide to silicon dioxide within the range from about 0.75 to about 1.00 $Li_2O$:about 0.05 to about 0.25 $Na_2O$:about 2.5 to about 5.0 $SiO_2$ and a total solids from about 10 percent to about 45 percent by weight; cooling said admixture to a temperature within the range from about 20° to about 30° C. to form an aqueous solution thereof; and then adding to said cool solution an amount from about 0.05 to about 0.10 percent by weight of an alkali metal dichromate and an alkaline borate selected from the group consisting of sodium borate and ammonium borate in the amount of about 0.01 to about 0.20 percent by weight.

21. A method for preparing a single-application coating composition which comprises admixing lithium hydroxide, sodium hydroxide, and a silica-containing material selected from the group consisting of silica gel and silicic acid, and water, while agitating same; heating said admixture while continuing the agitation thereof to a temperature within the range from about 75° to about 150° C. for a sufficient length of time to form an admixture of lithium and sodium silicates; said sodium and lithium hydroxides and silica-containing material being employed in amounts sufficient to provide a ratio of lithium oxide to sodium oxide to silicon dioxide within the range from about 0.75 to about 1.00 $Li_2O$:about 0.05 to about 0.25 $Na_2O$:about 2.5 to about 5.0 $SiO_2$ and a total solids from about 10 percent to about 45 percent by weight; cooling said admixture to a temperature within the range from about 20° to about 30° C. to form an aqueous solution thereof; adding to said cool solution a small but effective amount of an alkali metal dichromate to extend the pot-life upon addition of zinc dust; and adding to said solution a sufficient amount of zinc dust to provide a protective coating on exposed metallic surfaces protected by zinc.

22. A method in accordance with claim 21 in which the zinc dust has a particle size within the range from about 6 to about 25 microns.

23. A method in accordance with claim 21 in which the particle size is within the range from about 6 to about 10 microns.

24. A single-application coating composition consisting essentially of a dispersion of about 3 parts by weight of zinc dust in 1 part by weight of an aqueous solution of a mixture of lithium silicate and sodium silicate, said lithium silicate and said sodium silicate being employed in amounts sufficient to provide a molar ratio of lithium oxide to sodium oxide of about 3:1 and a molar ratio of silicon dioxide to the combined lithium oxide and sodium oxide of about 4.5:1 and potassium dichromate in an amount of about 0.05 weight percent of said aqueous solution.

25. A composition in accordance with claim 24 in which the zinc dust has a particle size within the range of about 3 to 25 microns.

26. A method for preparing a liquid vehicle for a single-application coating composition which comprises admixing lithium hydroxide, sodium hydroxide, a silica-containing material selected from the group consisting of silica gel and silica acid and water, while agitating same; heating said admixture while continuing the agitation thereof to a temperature of about 140° to about 150° C. for a sufficient length of time to form an admixture of lithium and sodium silicates; said lithium and sodium hydroxides and silica-containing material being employed in amounts sufficient to provide a ratio of lithium oxide to sodium oxide to silicon dioxide within the range from about 0.75 to about 1.00 $Li_2O$:about 0.05 to about 0.25 $Na_2O$:about 2.5 to about 5.0 $SiO_2$ and a total solids from about 10 percent to about 45 percent by weight; cooling said admixture to a temperature of about 95° C. at a rate within the range of about 0.61° C. to about 1.83° C. per minute, and thereafter cooling said admixture at a slower rate to a temperature within a range from about 20° to about 30° C. to form said liquid vehicle.

27. A method in accordance with claim 26 wherein said lithium and sodium hydroxides and silica-containing material are employed in amounts to produce a total solids of between 24 percent and 31 percent by weight.

28. A method in accordance with claim 26 wherein said lithium and sodium hydroxides and silica-containing material are employed in an amount to provide a ratio of lithium oxide to sodium oxide to silicon dioxide of about 0.75 $Li_2O$:about 0.25 $Na_2O$:about 4.5 $SiO_2$ and a total solids of between 24 percent and 31 percent by weight.

References Cited by the Examiner

UNITED STATES PATENTS

| | | | |
|---|---|---|---|
| 2,047,614 | 7/36 | Cavezzale | 23—110 |
| 2,434,466 | 1/48 | Marc | 106—84 |
| 2,881,049 | 4/59 | Erbe et al. | 23—110 |
| 2,914,413 | 11/59 | Mercer | 106—84 |
| 2,965,507 | 12/60 | Lander | 106—84 |
| 2,998,328 | 8/61 | Munger et al. | 106—84 |
| 3,002,857 | 10/61 | Stalego | 106—84 |
| 3,093,493 | 6/63 | Freyhold | 106—84 |
| 3,102,038 | 8/63 | Fisher | 106—84 |

OTHER REFERENCES

Mellor: "Comprehensive Treatise on Inorganic and Theoretical Chemistry," published by Longmans, Greer and Co., London, 1925, vol. 6, page 329.

Soluble Silicates in Industry, Vail, The Chemical Catalog Company Inc., New York, 1928, page 70.

TOBIAS E. LEVOW, *Primary Examiner.*

JOSEPH REBOLD, *Examiner.*